US 8,824,507 B2

(12) United States Patent
Honma et al.

(10) Patent No.: US 8,824,507 B2
(45) Date of Patent: Sep. 2, 2014

(54) TRANSMITTING APPARATUS AND SIGNAL TRANSMITTING METHOD

(75) Inventors: Hiroyuki Honma, Kawasaki (JP); Masahiro Shioda, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 13/463,136

(22) Filed: May 3, 2012

(65) Prior Publication Data

US 2012/0281985 A1 Nov. 8, 2012

Related U.S. Application Data

(63) Continuation of application No. PCT/JP2009/005976, filed on Nov. 10, 2009.

(51) Int. Cl.
*H04J 3/24* (2006.01)
*H04J 3/16* (2006.01)

(52) U.S. Cl.
CPC ....... *H04J 3/1652* (2013.01); *H04J 2203/0089* (2013.01)
USPC ........................................ 370/474

(58) Field of Classification Search
CPC .................. H04L 29/0653; H04L 2012/5652; H04L 5/06; H04L 29/06571; H04J 4/00; H04J 5/26
USPC ......... 370/474, 475, 476, 478, 480, 487, 490, 370/493, 498, 535, 536, 541, 542, 907
See application file for complete search history.

(56) References Cited

U.S. PATENT DOCUMENTS 6,230,195 B1 * 5/2001 Sugawara et al. ............. 709/220
2003/0123493 A1 7/2003 Takahashi

FOREIGN PATENT DOCUMENTS

| JP | 2003-188919 | 7/2003 |
|---|---|---|
| JP | 2004-120502 | 4/2004 |
| JP | 2008-113344 | 5/2008 |

OTHER PUBLICATIONS

English Translation of the Written Opinion of the International Searching Authority mailed Feb. 16, 2010 issued in corresponding International Patent Application No. PCT/JP2009/005976.
International Preliminary Report on Patentability mailed May 24, 2012 (English Translation mailed Jun. 21, 2012) issued in corresponding International Patent Application No. PCT/JP2009/005976.
International Search Report for PCT/JP2009/005976 mailed Feb. 16, 2010.
Japanese Office Action mailed Jan. 8, 2013 for corresponding Japanese Application No. 2011-540330.
Partial Translation of Japanese Reference No. 2008-113344, which was previously cited in the IDS filed May 3, 2012.

* cited by examiner

*Primary Examiner* — Chi Pham
*Assistant Examiner* — Alexander O Boakye
(74) *Attorney, Agent, or Firm* — Staas & Halsey LLP

(57) ABSTRACT

A transmitting apparatus includes a frame dividing circuit that maps frame data of each of a plurality of frames whose period is different from each other into one or a plurality of internal frames having a fixed frame period and a fixed transmission rate, based on a predetermined internal clock; a cross-connect circuit that cross-connects the frame data of each in a time division multiplexing system based on the internal clock in units of the internal frames; and a frame combining circuit that demaps, into any of the plurality of frames, or multiplexes, data of one or a plurality of internal frames cross-connected by the cross-connect circuit.

11 Claims, 13 Drawing Sheets

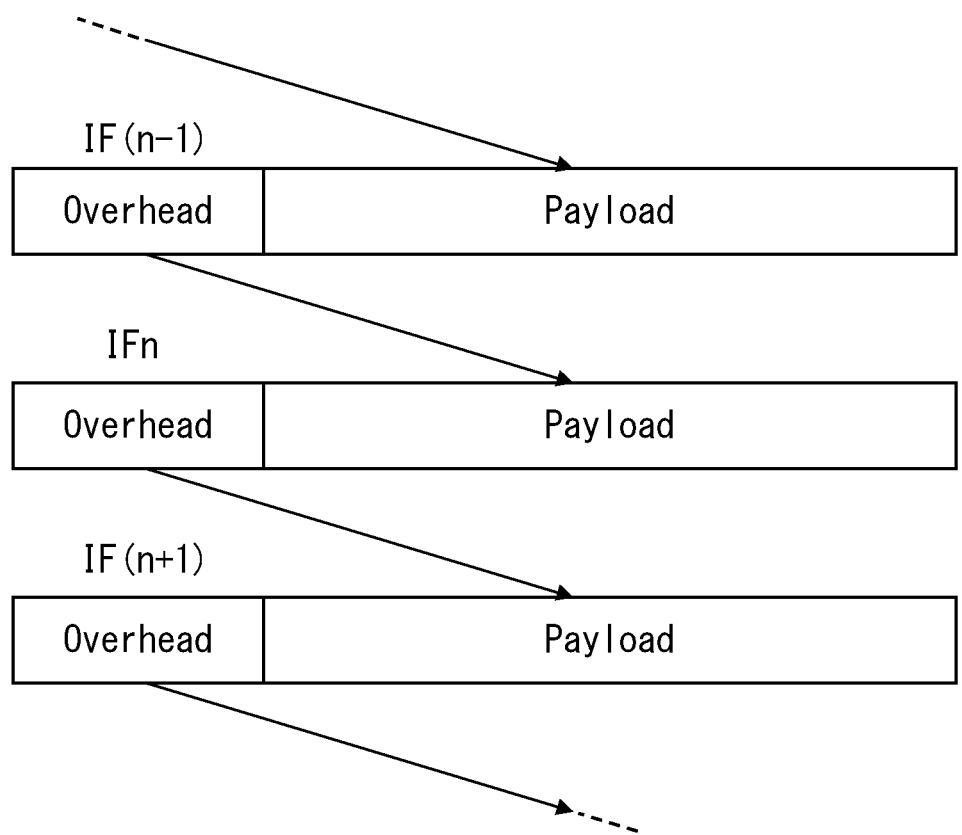
F I G. 5

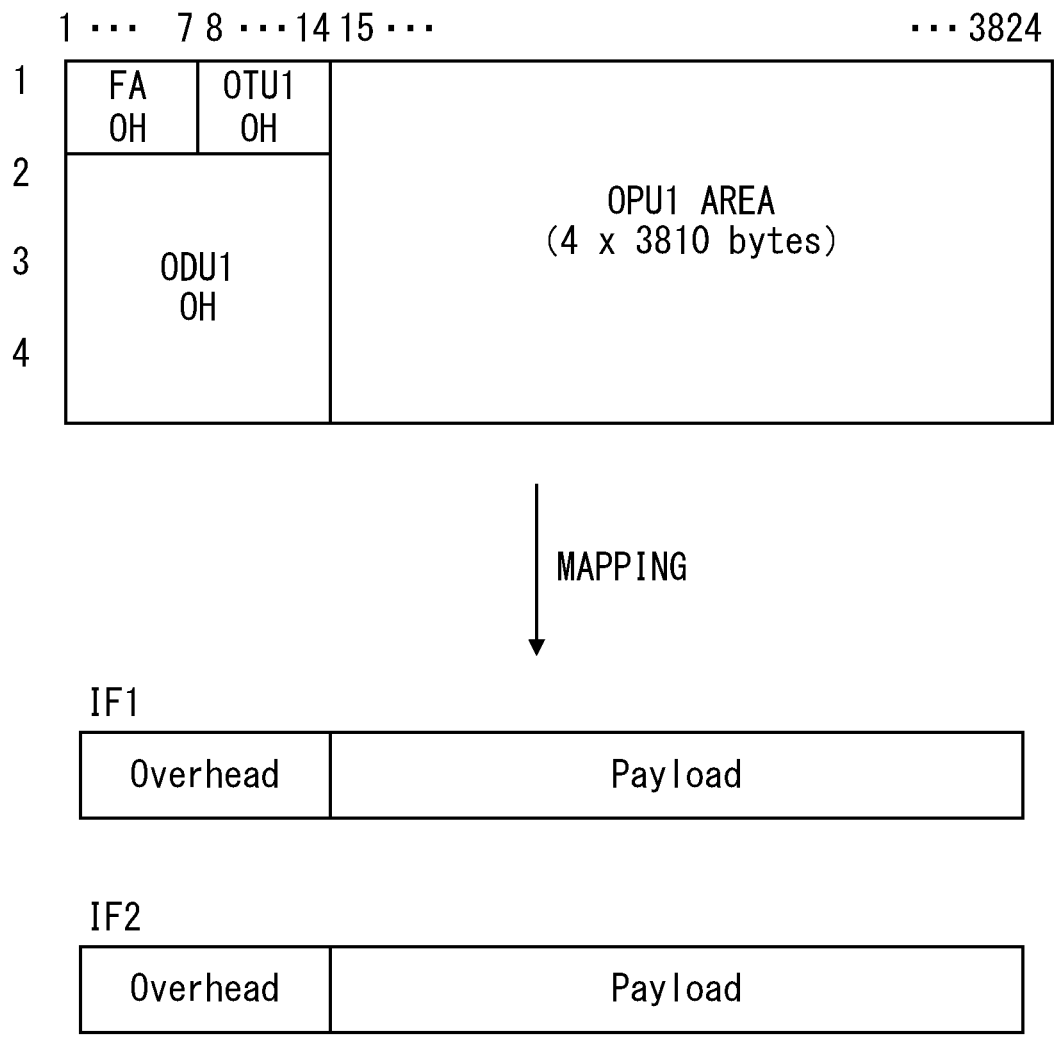
F I G. 6

FIG. 7

| FAS+BIP8 | Overhead | Payload | IF1 |
| | Overhead | Payload | IF2 |

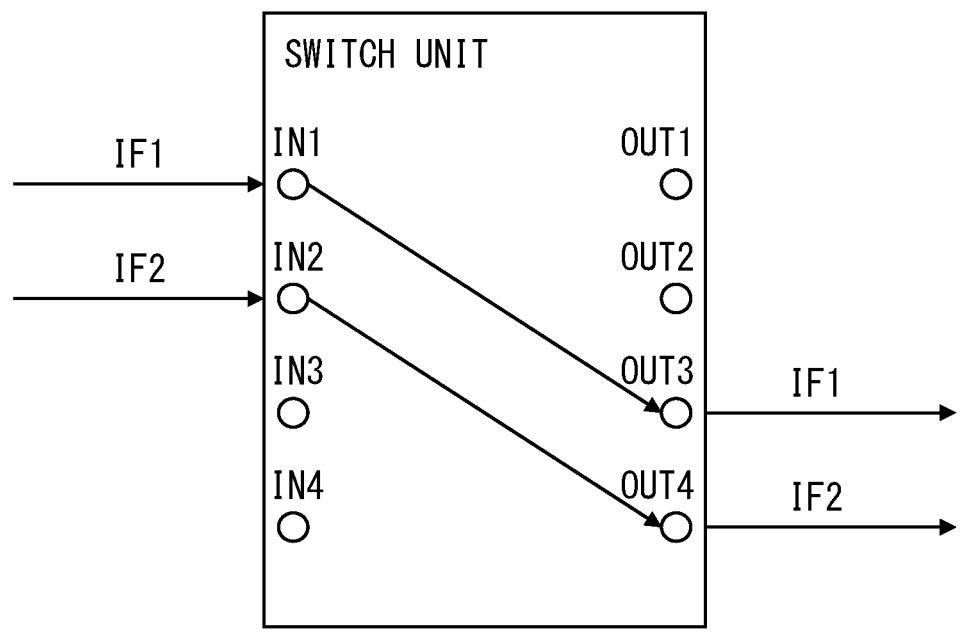
F I G. 8

IF1
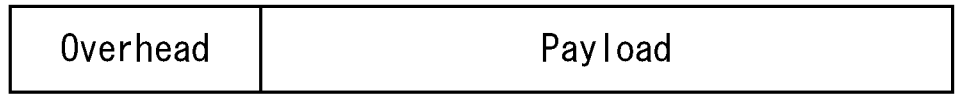
IF2
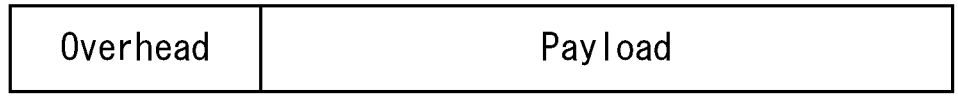
DEMAPPING
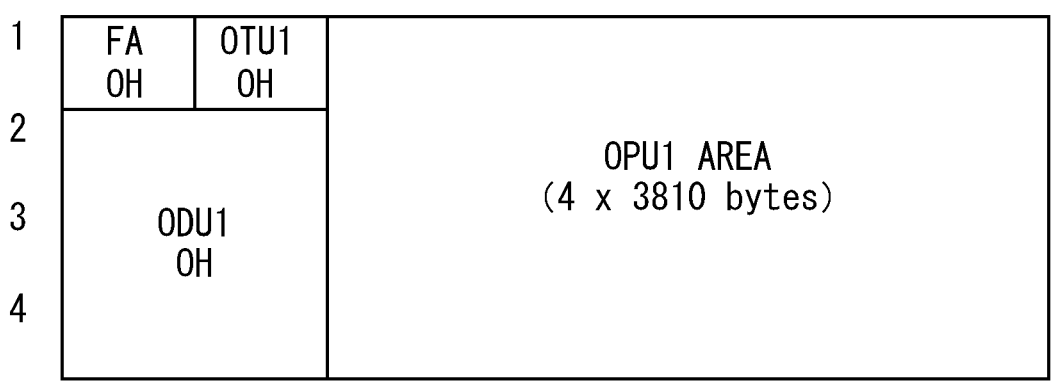
FIG. 9

|  | j | r | ts | ODTUk.ts Payload bytes | ODTUk.ts Overhead bytes |
|---|---|---|---|---|---|
| ODTU2.ts | 476 | 32 | 1 to 8 | 15232 x ts | 7 x ts |
| ODTU3.ts | 119 | 128 | 1 to 32 | 15232 x ts | 7 x ts |
| ODTU4.ts | 95 | 160 | 1 to 80 | 15200 x ts | 6 x ts |

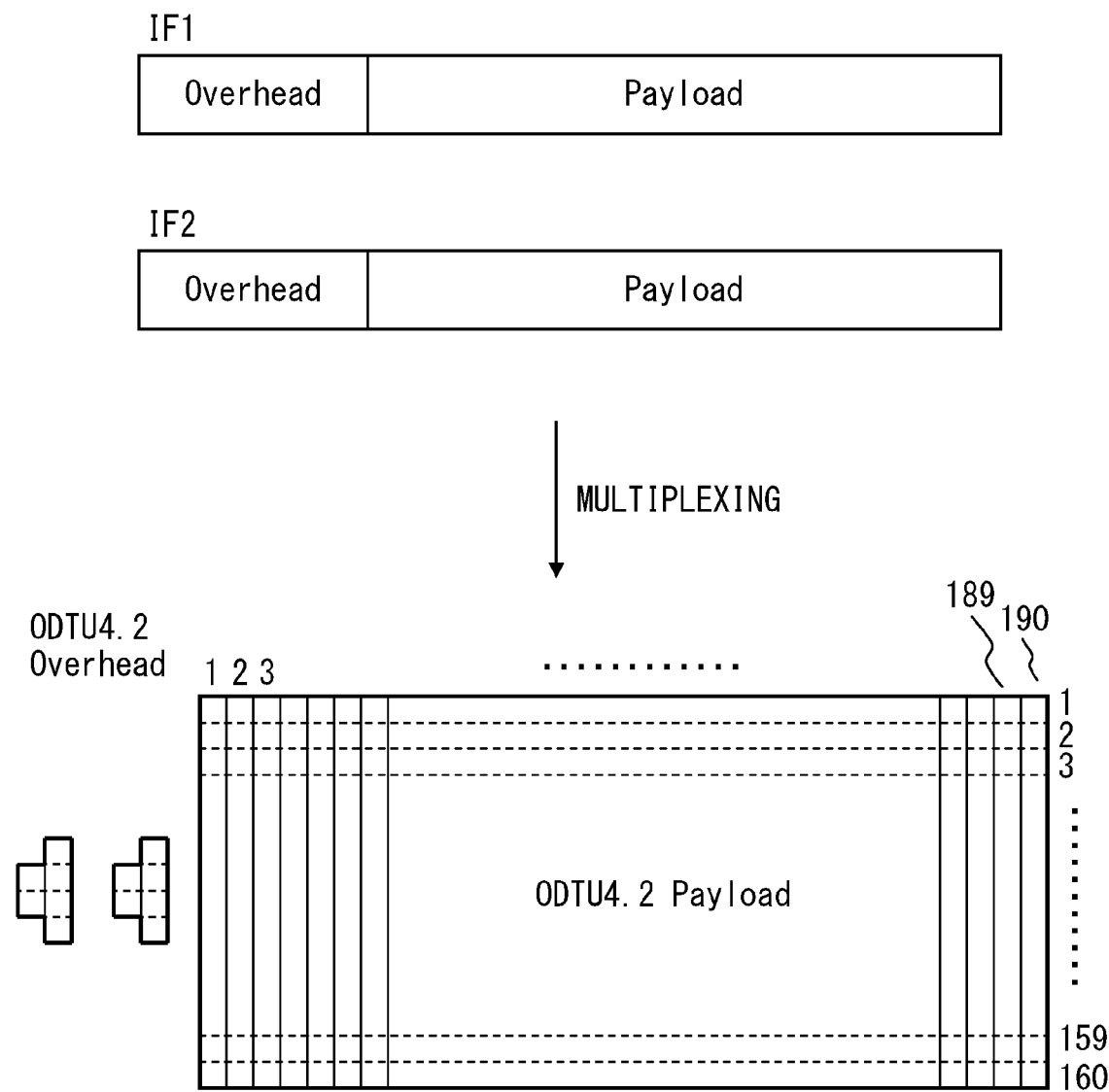
F I G. 1 2

TRANSMITTING APPARATUS AND SIGNAL TRANSMITTING METHOD

CROSS-REFERENCE TO RELATED APPLICATION

This application is a continuation application of International PCT Application No. PCT/JP2009/005976 which was filed on Nov. 10, 2009.

FIELD

The present invention relates to a transmitting apparatus and a signal transmitting method to perform cross connection in an optical transmission network.

BACKGROUND

As standards of the optical transmission technique to realize the speeding up of the line by hierarchically piling up and multiplexing low-speed lines, SONET/SDH (Synchronous Optical NETwork/ Synchronous Digital Hierarchy) has been standardized.

The frame period in SONET is 125 μs. In addition, the signal format and the like in SONET is hierarchically defined as OC-n (Optical Carrier-level n). Currently, the standardization has been done up to OC-192.

Meanwhile, the frame period in SDH is, in the same manner as the frame period in SONET, 125 μs. In addition, the signal format and the like in SDH is hierarchically defined as STM-n (Synchronous Transmission Module-level n). Currently, the standardization has been done up to M-64.

At OC-3/STM-1 and above, the transmission speed and the hierarchical structure in SONET and SDH are the same.

Here, referring to FIG. 1A-FIG. 1C, the relationship between the frame period and the transmission rate in SONET/SDH is explained. FIG. 1A is a diagram illustrating the relationship between the frame period and the transmission rate at OC-3. FIG. 1B is a diagram illustrating the relationship between the frame period and the transmission rate at OC-12. FIG. 1C is a diagram illustrating the relationship between the frame period and the transmission rate at OC-48. In FIG. 1A-FIG. 1C, the vertical axis represents the frame period, and the horizontal axis represents the transmission rate.

As illustrated in FIG. 1A-FIG. 1C, the size of the frame of OC-n changes depending on n. Specifically, the size of the frame of OC-n is n×90×9 bytes. In addition, as described above, in SONET/SDH, the frame period is constant at 125 μs regardless of the value of n. For this reason, the transmission rate of OC-n is n×51.84 Mbps.

Meanwhile, as a platform for transparent transmission of a client signal, OTN (Optical Transport Network) based on the WDM (Wavelength Division Multiplexing) system has been standardized. Here, the client signal includes, for example, OC-n, STM-n and the like in SONET/SDH, for example. The frame structure of ODUk (Optical Channel Data Unit k) in OTUk (Optical Transport Unit k) defined in OTN is equivalent to OTUk except for FEC (Forward Error Correction) and OH (Overhead).

Here, with reference to FIG. 2, the relationship between the frame period and the transmission rate of ODUk is explained. The vertical axis of FIG. 2 represents the frame period, and the horizontal axis represents the transmission rate. FIG. 2 illustrates the relationship between the frame period and the transmission rate of the ODU0, ODU1, ODU2.

As illustrated in FIG. 2, the size of the frame of ODUk is 3824×4 bytes regardless of the value of k. In contrast, the frame period of ODUk varies depending on the value of k. For example, the frame period of the ODU0 is 98.34 μs, the frame period of the ODU1 is 48.97 μs, and the frame period of the ODU2 is 12.191 μs. Therefore, the transmission rate of ODUk varies depending on the value of k.

The transmission rate of the ODU0 is 1244.16 Mbps. The transmission rate of the ODU1 is 2498.76 Mbps(=1244.16× 2×239/238 Mbps). The transmission rate of the ODU2 is 10037.27 Mbps(=1244.16×8×239/237 Mbps). While it is not illustrated in the drawing, the transmission rate of the ODU3 is 40319.21 Mbps(=1244.16×32×239/236 Mbps). The transmission rate of the ODU4 is 104794.45 Mbps(=1244.16×80× 239/227 Mbps).

Conventionally, in relation to OTN, a cross-connect apparatus that is capable of providing a clear channel service via networks with different control systems such as between a plurality of carriers has been proposed. The cross-connect apparatus has mapping the client signal in the payload section of an OTN frame, and switching means to perform switching in the ODUk sublayer of the OTN layer for the frame in which the client signal has been mapped.

Patent Document 1: Japanese Laid-open Patent Publication No. 2003-188919

SUMMARY

From a first viewpoint, a transmitting apparatus including a frame dividing circuit that maps frame data of each of a plurality of frames whose period is different from each other into one or a plurality of internal frames having a fixed frame period and a fixed transmission rate, based on a predetermined internal clock; a cross-connect circuit that cross-connects the frame data of each in a time division multiplexing system based on the internal clock in units of the internal frames; and a frame combining circuit that demaps, into any of the plurality of frames, or multiplexes, data of one or a plurality of internal frames cross-connected by the cross-connect circuit is provided.

Meanwhile, from the second viewpoint, a signal transmitting method in the transmitting apparatus is provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of the relationship between information stored in the overhead and the payload of the internal frame.

FIG. 6 is a diagram illustrating an example of the mapping of the internal frame by a frame dividing unit.

FIG. 7 is a diagram illustrating an example of data multiplexed at a first transmitting unit.

FIG. 8 is a diagram illustrating an example of a switch unit.

FIG. 9 is a diagram illustrating an example of the demapping of the internal frame by a frame combining unit.

FIG. 12 is a diagram illustrating an example of multiplexing of the internal frame by the frame combining unit.

DESCRIPTION OF EMBODIMENTS

As described above, the frame period in OC-n of SONET/SDH is 125 μs regardless of the value of n. For this reason, in order to realize a cross-connect to output a data signal to another path in OC-n in the TDM (Time Division Multiplexing) system, a plurality of cross-connect apparatuses having a transmission rate to be the reference (for example, OC-1) may be connected.

For example, it is assumed that there is a cross-connect apparatus having a transmission rate of OC-1. At this time, a cross-connect in the frame unit of OC-3 having a transmission rate of three times the transmission rate of OC-1 may be realized by connecting three units of the cross-connect apparatus for OC-1 in parallel.

In contrast to this, in OTN, the frame periods of ODUk are not in the relationship of integral multiple with each other. Specifically, as described above, an integral multiple of ODUk (k≥1) does not result in the frame period of 98.34 μs of ODU0. For this reason, for ODUk, unlike the case of the OC-n, the cross-connect cannot be realized in the TDM system by connecting a plurality of the cross-connect apparatuses having the transmission rate to be the reference (ODU0 for example). As a result, in order to realize the cross-connect in the TDM system in ODUk, a cross-connect apparatus for every ODUk for different values of k is to be used.

Therefore, an objective is to provide a transmitting apparatus and a signal transmitting method with which cross connection for a plurality of frames of different periods from each other may be performed efficiently in an optical transmission network.

<First Embodiment>
(Transmitting Apparatus)

A transmitting apparatus of the present embodiment extracts an ODUk signal from a network signal input from a network, for example an OTUk signal. In addition, the transmitting apparatus of the present embodiment generates an ODUk signal from a client signal input from a client apparatus and the like, for example a signal in the SONET format (OC-1, OC-3, OC-12), a signal in the Ethernet (Ethernet is a registered trademark) format, and a signal in the Fibre Channel format. In other words, a signal in the SONET format (OC-1, OC-3, OC-12), a signal in the Ethernet (Ethernet is a registered trademark) format, and a signal in the Fibre Channel format are mapped into an ODUk signal.

Then, the transmitting apparatus generates an internal frame whose frame period and transmission rate are fixed regardless of the value of k from extracted or generated ODUk signal, and performs cross connection in the TDM system in units of internal frames. In addition, the transmitting apparatus generates an ODUk signal from the cross-connected internal frame, and outputs it to a network or a client apparatus. Here, the signal to be output to a network is, for example, an OTUk signal. Meanwhile, the signal to be output to a client apparatus is, for example, a signal in the SONET format (OC-3/OC-12/OC-48, . . . ), a signal in the Ethernet format.

Figure 1A:
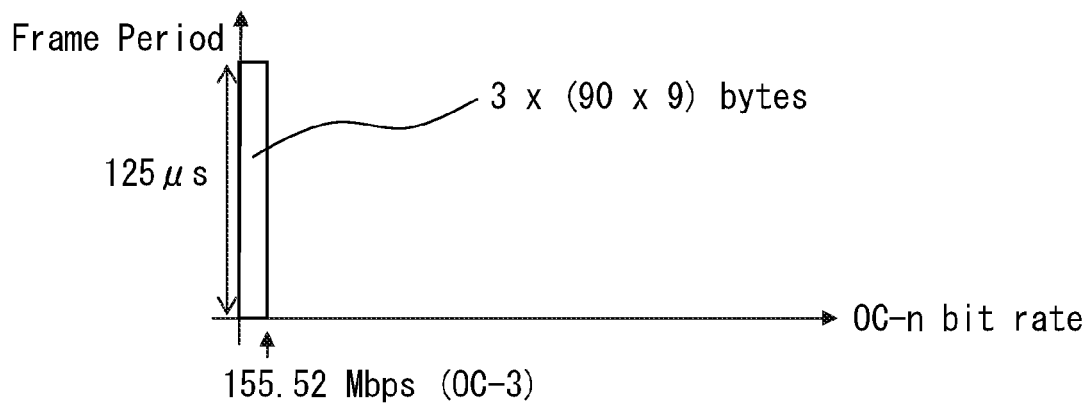
FIG. 1A is a diagram illustrating the relationship between the frame period of OC-3.
Figure 1B:
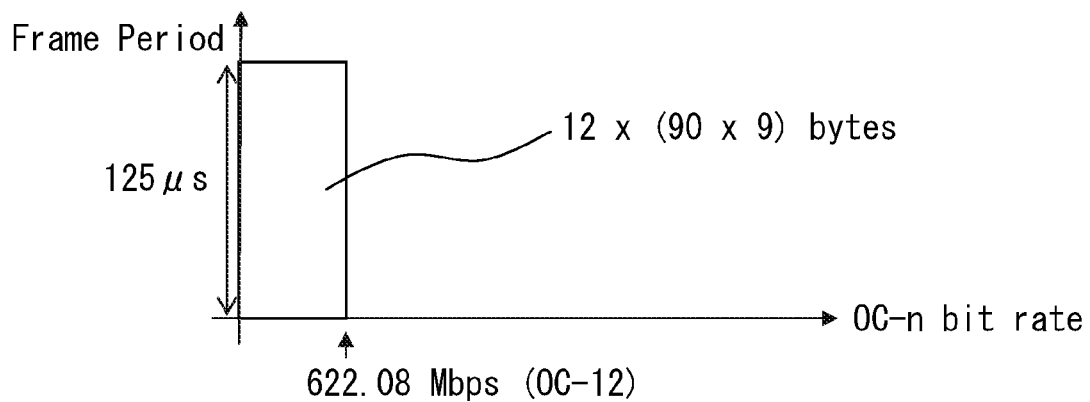
FIG. 1B is a diagram illustrating the relationship between the frame period of OC-12.
Figure 1C:
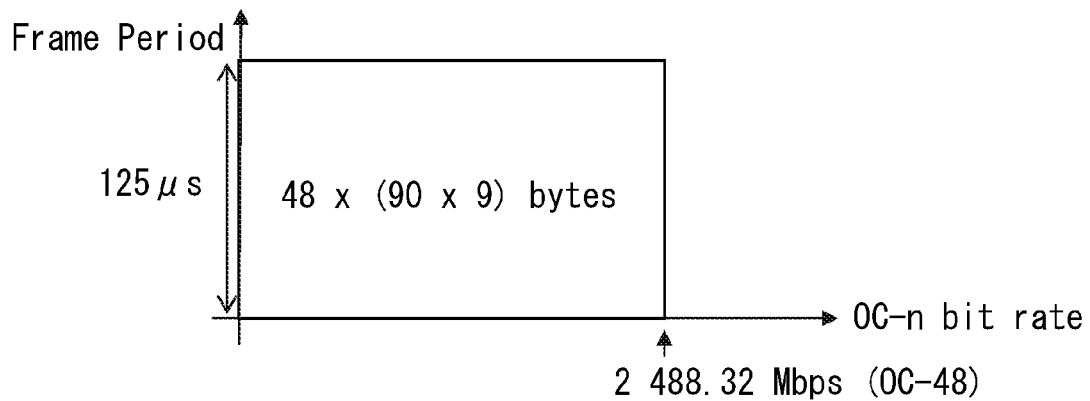
FIG. 1C is a diagram illustrating the relationship between the frame period of OC-48.
Figure 2:
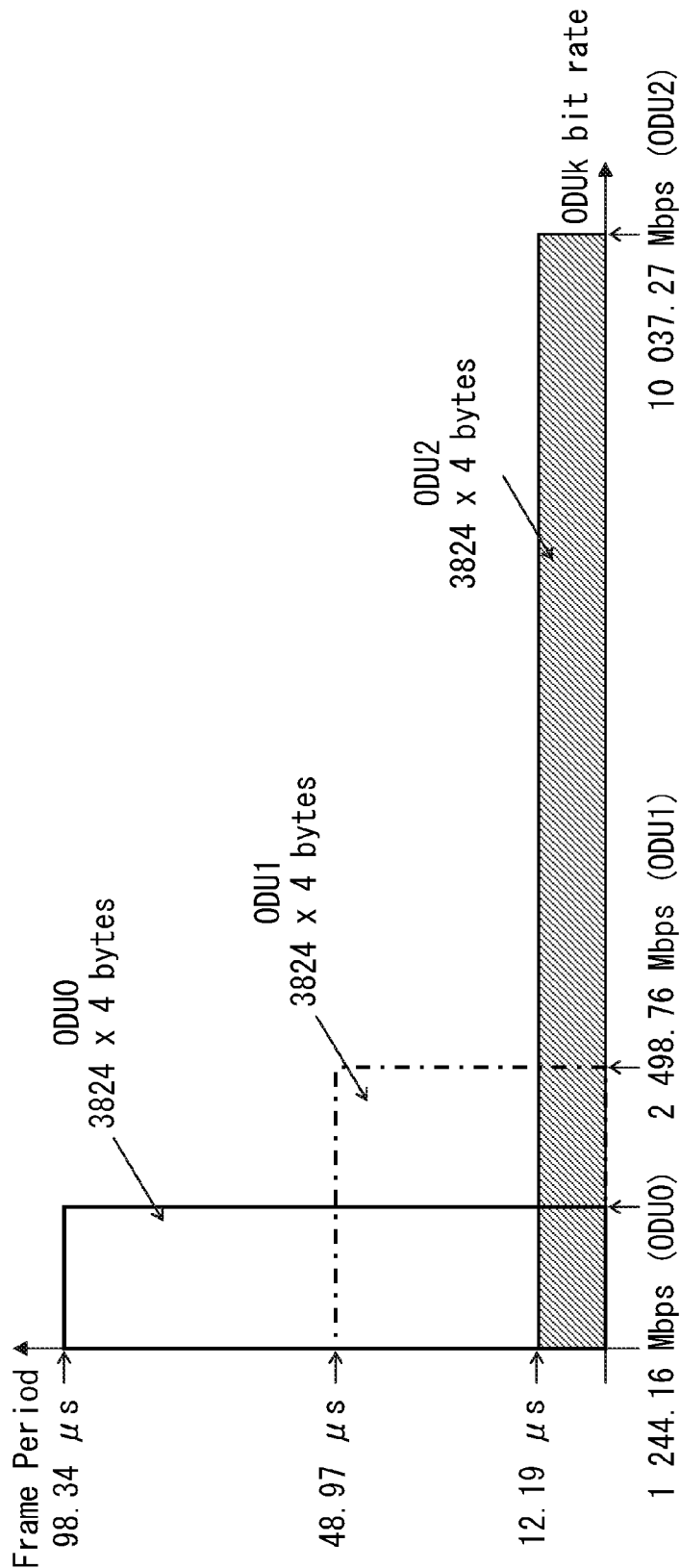
FIG. 2 is a diagram illustrating the relationship between the frame period of ODUk.
Figure 3:
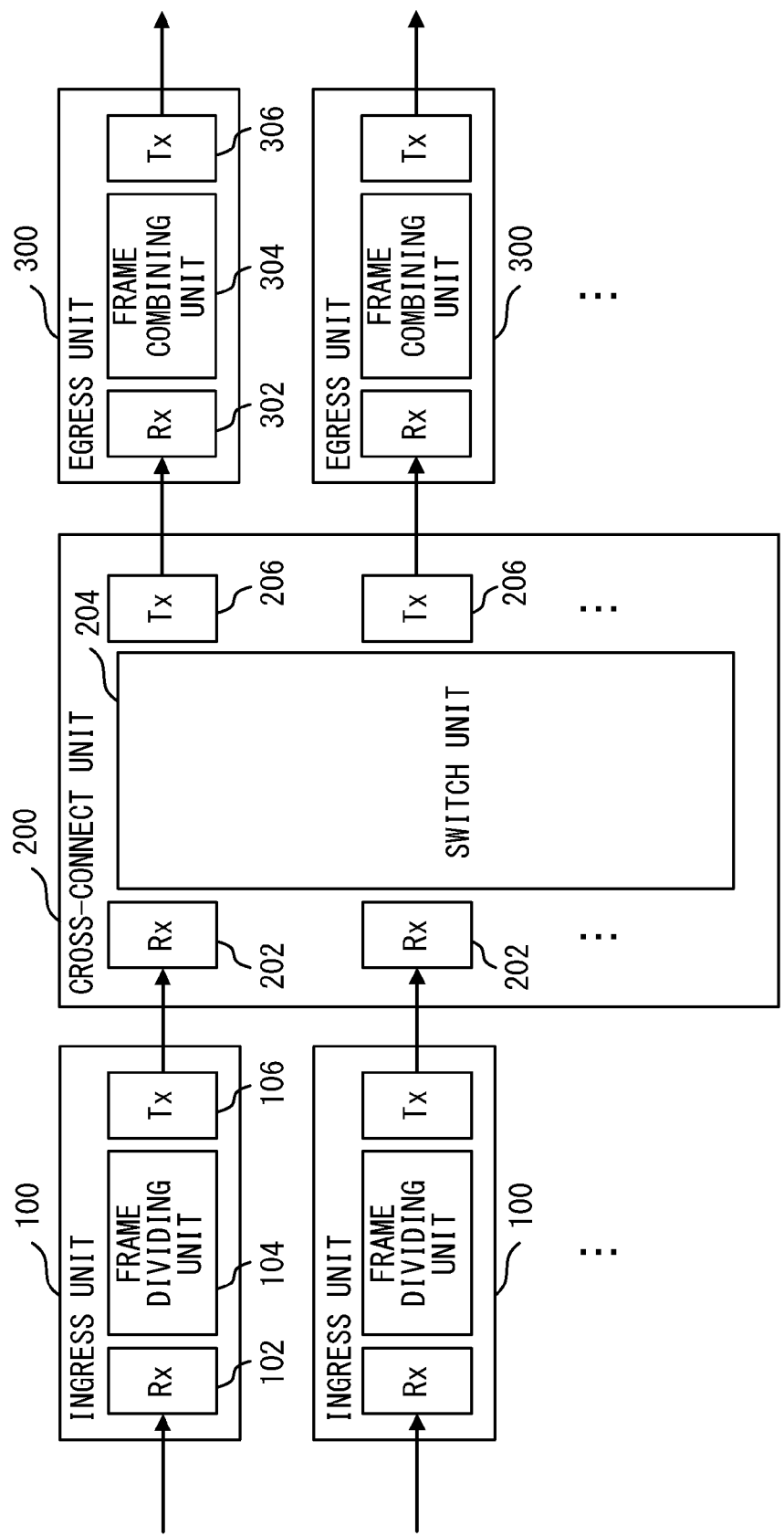
FIG. 3 is a diagram illustrating an example of an outline configuration of a transmitting apparatus.

First, with reference to FIG. 3, the configuration of the transmitting apparatus of the present embodiment is explained. FIG. 3 is a diagram illustrating an example of an outline configuration of the transmitting apparatus of the present embodiment. As illustrated in FIG. 3, the transmitting apparatus of the present embodiment includes a plurality of ingress units 100, a cross-connect unit 200, and a plurality of egress units 300.

(Ingress Unit)

First, the ingress unit 100 is explained. As illustrated in FIG. 3, the ingress unit 100 has a first receiving unit 102, a frame dividing unit 104, and a first transmitting unit 106.

First, the first receiving unit 102 is explained. The first receiving unit 102 receives input of a network signal and a client signal. In addition, the first receiving unit 102 extracts or generates a predetermined ODUk signal from the received network signal and client signal.

At the ingress unit 100, a predetermined ODUk signal may be extracted or generated according to the type of the signal input to the first receiving unit 102.

For example, when an OTUk signal is input as a network signal, the first receiving unit 102 may extract an ODU1 signal (however, 1<k) by removing the overhead and FEC from the input OTUk signal or diving the input OTUk signal.

Meanwhile, the first receiving unit 102 may generate an ODUm signal (however, m>k) by mapping a client signal into an ODUk signal, or by multiplying the mapped ODUk signal.

Next, the frame dividing unit 104 is explained. The frame dividing unit 104 maps a predetermined ODUk signal extracted or generated by the first receiving unit 102 into one or a plurality of internal frames whose frame period and transmission rate are fixed, based on a predetermined internal clock. More specifically, the frame dividing 104 unit may be a frame dividing circuit, as an example. Other examples, the frame dividing unit 104 includes a FPGA (Field-Programmable Gate Array) and a processor.

Figure 4A:
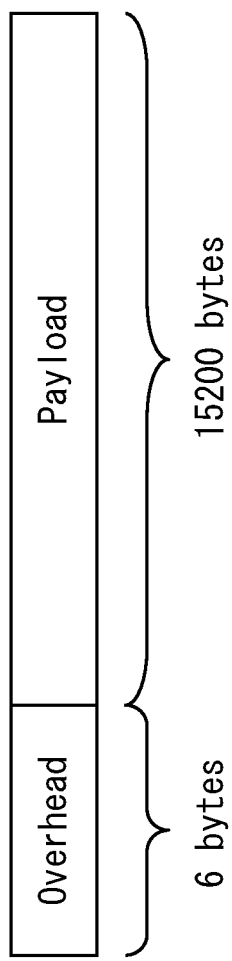
FIG. 4A is a diagram illustrating an example of the frame structure of an internal frame.
Figure 4B:
FIG. 4B is a diagram illustrating an example of the structure of the overhead of the internal frame.

Here, with reference to FIG. 4A and FIG. 4B, the frame structure of the internal frame is explained. FIG. 4A is a diagram illustrating an example of the frame structure of the internal frame. FIG. 4B is a diagram illustrating an example of the structure of the overhead of the internal frame. As illustrated in FIG. 4A, the internal frame of the present embodiment includes a 6-byte overhead and a 15200-byte payload. The transmission rate of the internal frame of the present embodiment is 1.301 Gbps . Meanwhile, the frame period of the internal frame is 93.42 μs. The frame period of the internal frame is 80 times the frame period of ODU4. In the payload of the internal frame, data and staff are stored in units of bytes.

Meanwhile, in the overhead of the internal frame of the present embodiment illustrated in FIG. 4B, information equivalent to Justification Overhead (JC1-JC6) of ODTU4.ts is stored.

Here, with reference to FIG. 5, information stored in the overhead of the internal frame of the present embodiment is explained. FIG. 5 is an example illustrating the relationship between information stored in the overhead and payload of the internal frame of the present embodiment. As illustrated in FIG. 5, in the present embodiment, in the overhead of an (n−1)th internal frame IF (n−1), information for identifying the location at which data is mapped in the payload of the n-th internal frame IFn is stored.

Hereinafter, with reference to FIG. 6, a case in which the frame dividing unit 104 maps an ODU1 signal extracted or generated by the first receiving unit 102 into two internal frames is explained. FIG. 6 is a diagram illustrating an example of the mapping of the ODU1 signal into internal frames by the frame dividing unit 1014. The top diagram in FIG. 6 illustrates the frame structure of the ODU1 signal 1. In the example illustrated in FIG. 6, the frame dividing unit 104 maps the ODU1 signal into two internal frames, an internal frame IF1 and an internal frame IF2. For the mapping, for example, the GMP (Generic Mapping Procedure) system may be used. The GMP system is a method for mapping data between frames with different transmission rates, which adjusts the difference between the transmission rates of the frame signal of the mapping source and the payload area of the frame of the mapping destination by staff.

Meanwhile, for the mapping into two internal frames, for example, 2 byte granularity may be used.

As described above, in the example illustrated in FIG. 6, the frame diving unit 104 generates two internal frames from the ODU1 signal.

Meanwhile, the number of internal frames that the frame dividing unit 104 generates may be a number with which data may be transmitted using the internal frame whose frame period and the transmission rate are determined in advance. For example, the frame dividing unit 104 generates one internal frame from the ODU0 signal, generates two internal frames from the ODU1 signal, generates eight internal frames from the ODU2 signal, generates 32 internal frames from the ODU3 signal, and generates 80 internal frames from the ODU4 signal.

Next, returning to FIG. 3, the first transmitting unit 106 is explained. The first transmitting unit 106 multiplexes one or a plurality of internal frames generated by the frame dividing unit 104. In addition, the first transmitting unit 106 FAS (Frame Alignment Signal) for performing synchronous detection for multiplexed data and BIP-8 (Bit Interleaved Parity-8) for performing transmission error detection to the multiplexed data.

Here, as the method to multiplex the internal frame, for example, a method for multiplexing in units of bits, in units of bytes, in units of internal frames may be used.

FIG. 7 is a diagram illustrating an example the data structure in which two internal frames internal frame IF1 and internal frame IF2 are multiplexed in units of internal frames.

(Cross-Connect Unit)

Next, returning to FIG. 3, the cross-connect unit 200 is explained. The cross-connect unit 200 performs cross connection in units of internal frames in the TDM system based on a predetermined internal clock. As illustrated in FIG. 3, the cross-connect unit 200 includes a plurality of second receiving units 202, a switch unit 204, and a plurality of second transmitting units 206. More specifically, the cross-connect unit 200 may be a cross-connect circuit, as an example. Other examples, the cross-connect unit 200 includes a FPGA (Field-Programmable Gate Array) and a processor.

The second receiving unit 202 performs synchronous detection for the multiplexed frame using FAS, and also performs error detection for the multiplexed frame using BIP-8. In addition, the second receiving unit 202 separates the multiplexed internal frame.

Next, with reference to FIG. 8, the switch unit 204 is explained. FIG. 8 is a diagram illustrating an example of the configuration of the switch unit 204. The switch unit 204 includes a plurality of input ports INn and a plurality of output port OUTn. The switch unit 204 outputs an internal frame input to a predetermined input port INn from a predetermined output port OUTn in the frame in the TDM system. The output port OUTn from which the internal frame input to the input port INn is output is recorded in the overhead of the internal frame. Therefore, the switch unit 204 outputs the internal frame from a predetermined output port OUTn based on the information recorded in the overhead of the internal frame. In the example illustrated in FIG. 8, the internal frame IF1 input to the input port IN1 is output to the output port OUT3, and internal frame IF2 input to the input port IN2 is output to the output port OUT4.

In the transmitting apparatus of the present embodiment, the frame period and the transmission rate of the internal frame input to the input port INn of the switch unit 204 are fixed regardless of the value of k. For this reason, cross connection may be performed for ODUk signals whose frame period and transmission rate are different from each other, without providing the switch unit for every different value of k.

The second transmitting unit 206 multiplexes one or a plurality of internal frames output from the switch unit 204, in the same manner as the first transmitting unit 106 described above. In addition, the second transmitting unit 206 attaches FAS for performing synchronous detection for multiplexed data and BIP-8 for performing transmission error detection to the multiplexed data.

(Egress Unit)

Next, returning to FIG. 3, the egress unit 300 is explained. As illustrated in FIG. 3, the egress unit 300 includes a third receiving unit 302, a frame combining unit 304 and a third transmitting unit 306.

The third receiving unit 302 performs synchronous detection of a multiplexed frame using FAS and also performs transmission error detection for the multiplexed frame using BIP-8, in the same manner as the second receiving unit 202. In addition, the third receiving unit 302 separates the multiplexed internal frame.

The frame combining unit 304 demaps data of one or plurality of internal frames cross-connected by the cross-connect unit 200 into the ODUk signal. More specifically, the frame combining unit 304 may be a frame combining circuit, as an example. Other examples, the frame combining unit 304 includes a FPGA (Field-Programmable Gate Array) and a processor.

Hereinafter, with reference to FIG. 9, an example of demapping by the frame combining unit 304 into the ODU1 signal with the data of the internal frame IF1 and the internal frame IF2 cross-connected by the cross-connect unit 200 as the target. FIG. 9 is an example illustrating an example of the demapping of two frames into the ODU1 signal by the frame combining unit 304. As illustrated in FIG. 9, the frame combining unit 304 of the present embodiment demaps two internal frames the internal frame IF1 and the internal frame IF2 and generates the ODU1 signal.

With the demapping, using information stored in the overhead, the location at which data is mapped in the payload may be identified. The demapping is performed using the GMP system described above. In addition, for the demapping from two internal frames, 2 byte granularity is used in the same manner as for the mapping.

As described above, in the example illustrated in FIG. 9, the frame combining unit 304 generates the ODU1 signal from two internal frames.

Next, returning to FIG. 3, the third transmitting unit 306 is explained. The third transmitting unit 306 outputs a network signal and a client signal using the ODUk signal generated by the frame combining unit 304.

At the egress unit 300, a network signal and a client signal are output using the ODUk signal, according to the type of the signal that the third transmitting unit 306 outputs.

For example, the third transmitting unit 306 may output an OTNk signal by adding an OUT overhead to the ODUk signal generated by the frame combining unit 304, or by multiplying the ODUk signal generated by the frame combining unit 304.

In addition, the third transmitting unit 306 may output a client signal by demapping the ODUk signal generated by the frame combining unit 304, or by demapping a signal generated by dividing the ODUk signal generated by the frame combining unit 304.

Described above is the outline configuration of the transmitting apparatus of the present embodiment.

(Signal Transmitting Method)

Next, a signal transmitting method using the transmitting apparatus of the present embodiment described above is explained. Meanwhile, the transmitting unit described above extracts or generates an ODUk signal from an input network signal and client signal. In addition, the transmitting apparatus generates an internal frame whose frame period and transmission rate are fixed regardless of the value of k from the extracted or generated ODUk signal, and performs cross connection in the TDM system in units of internal frames. In addition, the transmitting apparatus described above generates the ODUk signal from the cross-connected internal frame, and outputs it as a network signal and a client signal. Hereinafter, while the case of k=1 is explained particularly, the signal transmitting method below may be applied in the same manner to the cases of other values of k.

Figure 10:
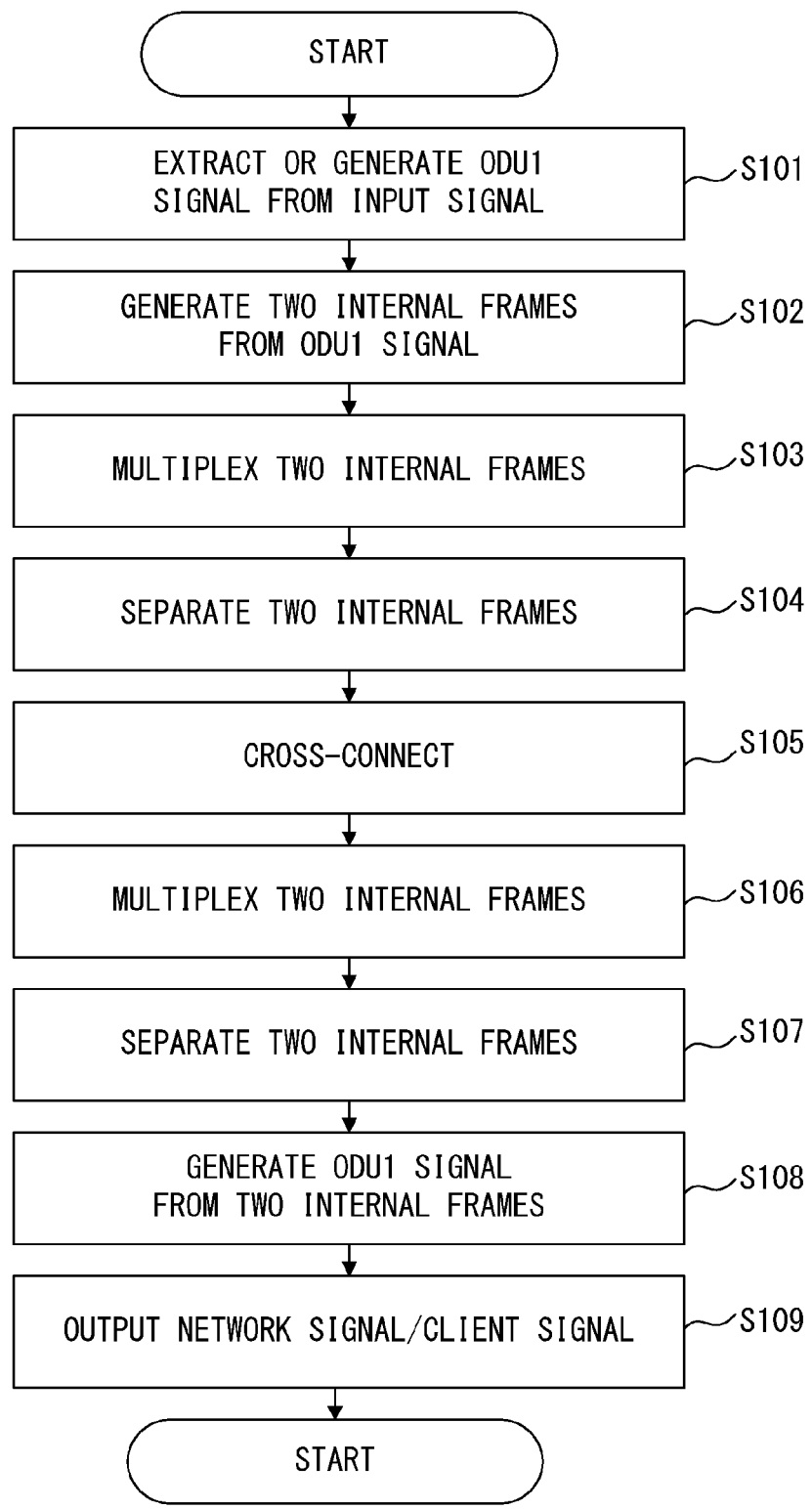
FIG. 10 is a flowchart illustrating an example of a signal transmitting method.

FIG. 10 is a flowchart illustrating an example of the signal transmitting method of the present embodiment.

First, the first receiving unit 102 receives input of a network signal and a client signal. The first receiving unit 102 extracts or generates an ODU1 signal according to the type of the received network signal and client signal (step S101).

Next, the frame dividing unit 104 maps the ODU1 signal extracted or generated by the first receiving unit 102 into two internal frames whose frame period and transmission rate are fixed, based on a predetermined internal clock (step S102). Since the frame structure of the internal frame is same as that explained with reference to FIG. 4A and FIG. 4B, detail explanation is omitted here. In addition, for the mapping into two internal frames from the ODU1 signal, the GMP system with 2byte granularity described above is used.

Next, the first transmitting unit 106 multiplexes the two internal frames generated by the frame dividing unit 104. In addition, the first transmitting unit 106 attaches FAS for performing synchronous detection for the multiplexed data and BIP-8 for performing transmission error detection to the multiplexed data (step S103). In the present embodiment, as illustrated in FIG. 7, two internal frames are multiplexed in units of internal frames.

Next, the second receiving unit 202 performs synchronous detection for the multiplexed frame using FAS, and also performs error detection for the multiplexed frame using BIP-8. In addition, the second receiving unit 202 separates the double-multiplexed internal frame (step S104).

Next, the switch unit 204 outputs the internal frame input to a predetermined input INn from a predetermined output port OUTn in the frame period of the internal frame determined in advance in the TDM system (step S105).

In the signal transmitting method of the present embodiment, the frame period and transmission rate of the internal frame input to the input port INn of the switch unit 204 are fixed regardless of the value of k. Therefore, by performing a regular switch process, cross connection may be performed for ODUk signals whose frame period and transmission rate are different from each other, without providing the switch unit for every different value of k.

Next, the second transmitting unit 206 multiplexes two internal frames output from the switch unit 204. In addition, the second transmitting unit 206 attaches FAS for performing synchronous detection for the multiplexed data and BIP-8 for performing transmission error detection to the multiplexed data (step S106).

Next, the third receiving unit 302 performs synchronous detection for the multiplexed frame using FAS, and also performs error detection for the multiplexed frame using BIP-8. In addition, the third receiving unit 302 separates the double-multiplexed internal frame (step S107).

Next, the frame combining unit 304 demaps the data of the two internal frames cross-connected by the cross-connect unit 200 into the ODU1 signal (step S108). For the demapping from two internal frames into the ODU1 signal, the GMP system with 2 byte granularity described above is used.

Next, the third transmitting unit 306 outputs a network signal and a client signal according to the ODU1 signal generated by the frame combining unit 304 (step S109).

As explained above, with the transmitting apparatus and the signal transmitting method of the present embodiment, the frame dividing unit 104 maps the predetermined ODUk signal extracted or generated by the first receiving unit 102 into one or a plurality of internal frames whose frame period and transmission rate are fixed, based on a predetermined internal clock. Therefore, the cross-connect unit 200 may perform cross connection efficiently for a plurality of frames whose period is different form each other, like the ODUk signal.

(Modification Example) 1

While in the first embodiment, an example of the internal frame was explained with reference to FIG. 4A and FIG. 4B, the size, transmission rate, frame period of the internal frame are not limited to this. The size, transmission rate, frame period of the internal frame may take arbitrary values within the range in which the frame data of the ODUk signal may be transmitted.

For example, while the size of the payload of the internal frame is 15200 bytes in the first embodiment, the size of the payload of the internal frame may be determined arbitrarily within the range in which the frame data of the ODUk signal may be transmitted with the transmission rate and the frame period. In the same manner, while the transmission rate of the internal frame is 1.301 Gbps and the frame period is 93.42 μs in the first embodiment, the transmission rate and the frame period of the internal frame may be determined arbitrarily within the range in which the frame data of the ODUk signal may be transmitted.

(Modification Example) 2

While the example in which the frame dividing unit 104 generates one internal frame from the ODU0 signal was explained in the first embodiment, the number of internal frames that the frame dividing unit 104 is not limited to this.

For example, when the ODU0 signal is divided into two internal frames and transmitted, an internal frame whose frame period and transmission rate are determined in advance within a range in which the ODU0 signal may be transmitted with two internal frames may be used. In this case, the frame dividing unit 104 generates two frames from the ODU0 signal, generates four internal frames from the ODU1 signal, generates 16 internal frames from the ODU2 signal, generates 64 internal frames from the ODU3 signal, and generates 160 internal frames from the ODU4 signal.

Here, by making the transmission rate in mapping the ODUk signal into m units of internal frames larger than the value obtained by dividing the transmission rate of the ODUk signal by m, the frame data of the ODUk signal may be dividing into m units and transmitted. Therefore, by making the transmission rate in mapping the ODUk signal into m units of internal frames larger than the value obtained by dividing the transmission rate of the ODUk signal by m, it becomes possible to map the ODUk signal into m units of internal frames whose frame period and transmission rate are determined in advance. As a result, the cross-connect unit 200 may perform cross connection efficiently for a plurality of frames whose period is different from each other like the ODUk signal.

(Modification Example) 3

While information for identifying the location at which data is mapped in the payload is stored in the overhead of all the internal frames as explained with reference to FIG. 5 in the first embodiment, the first embodiment is not limited to this. For example, it will do as long as the information for identifying the location at which data is mapped in the payload is stored in the overhead of one of the internal frames.

In addition, while information for identifying the location at which data is mapped in the payload of the n-th internal frame IFn is stored in the overhead of the (n−1) th internal frame IF (n−1) as explained with reference to FIG. 5 in the first embodiment, the first embodiment is not limited to this. For example, in the overhead of the n-th internal frame IFn, the information for identifying the location at which data is mapped in the payload of the n-th internal frame IFn may be stored.

<Second Embodiment>

In the first embodiment, the example was explained in which the ODUk signal is extracted or generated from an input network signal and a client signal, cross connection is performed using an internal frame, and the ODUk signal is generated. Here, currently, the OTUk signal has been defined up to the OTU4 signal whose transmission rate is about 100 Gbps. In the optical transmission network in recent years, transmission of signals at a faster transmission rate is required, and for a transmitting apparatus like the one described above, outputting of, for example, the OTU4 signal is required.

Here, when the OTU4 signal is generated from the ODUk signal (k=0, 1, 2, 3), generally, after mapping the ODUk signal into the ODTU4. ts signal, the OTU4 signal is generated by multiplying the ODTU4. ts signal. Therefore, if a signal that has been cross-connected in the transmitting apparatus is to be output as the OTU4 signal, it is preferable to generate the ODTU4.ts signal from one or a plurality of internal frames.

Therefore, the transmitting apparatus of the present embodiment extracts or generates the ODUk signal from an input network signal and a client signal, generates an internal frame from the extracted or generated ODUk signal, and performs cross connection. After that, the transmitting apparatus of the present embodiment generates the ODTU4.ts signal from the internal frame, and outputs the OTU4 signal.

Figures 11A, 11B:
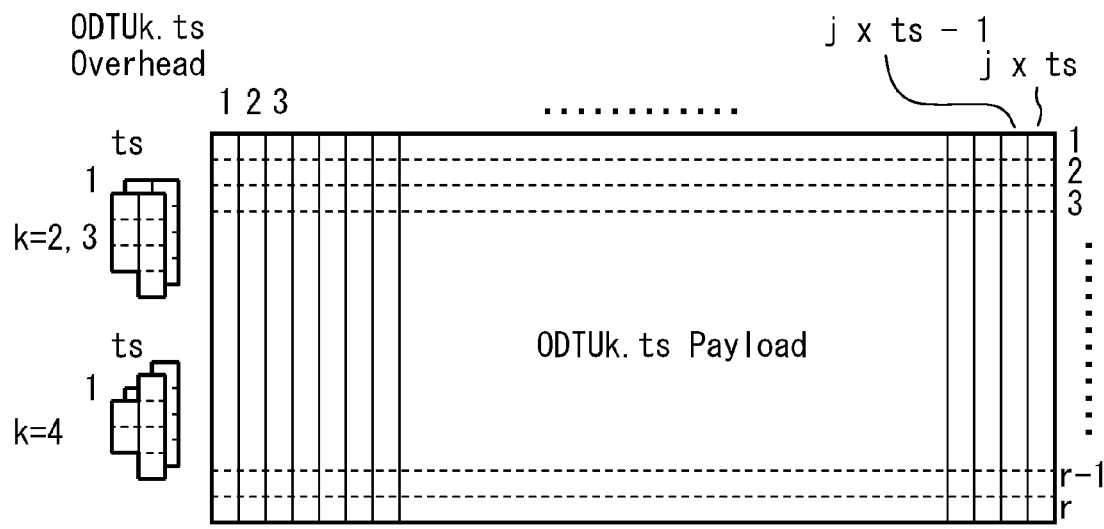
FIG. 11A and FIG. 11B are diagrams illustrating an example of the frame structure of ODTUk.ts.

First, before explaining the transmitting apparatus and the signal transmitting method of the present embodiment, the frame structure of the ODTUk.ts is explained with reference to FIG. 11A and FIG. 11B. FIG. 11A and FIG. 11B are diagrams illustrating the frame structure of ODTUk.ts. As illustrated in FIG. 11A, the overhead of ODTUk.ts is 7×ts bytes when k=2, 3 and is 6×ts bytes when k=4. Meanwhile, the payload of ODTUk.ts is 15232×ts bytes when k=2, 3 and is 15200×ts bytes when k=4. The number of rows and columns of the payload is defined by the table in FIG. 11B.

(Transmitting Apparatus)

Hereinafter, the configuration of the transmitting apparatus of the present embodiment is explained. Since the basic configuration of the transmitting apparatus of the present embodiment is similar to the first embodiment, explanation of similar parts is omitted.

First, the configuration of the ingress unit 100 of the present embodiment is similar to the configuration explained with reference to FIG. 3 through FIG. 7. Here, as illustrated with reference to FIG. 4A and FIG. 4B, the internal frame includes a 6-byte overhead and 15200-byte payload. In addition, information equivalent to Justification Overhead (JC1-JC6) of ODTU4.ts is stored in the overhead of the internal frame. As described above, the overhead of ODTU4.ts is 6×ts bytes, the payload is 15200×ts bytes. Therefore, by making the overhead six bytes, the payload 15200 bytes and storing information equivalent to JC1-JC6 of ODTU4.ts mentioned above in the overhead of the internal frame, the ODTU4.ts signal may be generated easily from a plurality of internal frames, as described later.

In addition, as explained with reference to FIG. 5, in the overhead of the (n−1)th internal frame IF(n−1), the information for identifying the location at which data is mapped in the payload of the n-th internal frame IFn is stored. Therefore, when generating the ODTU4.ts signal from a plurality of internal frames, data of the overhead of the internal frame may be used easily as data of the overhead of the ODTU4.ts.

The configuration of the cross-connect unit 200 is similar to that in the first embodiment.

Next, the configuration of the egress unit 300 is explained. First, the configuration of the third receiving unit 302 is similar to that in the first embodiment.

The frame combining unit 304 of the present embodiment multiplexes data of one or a plurality of internal frames cross-connected by the cross-connect unit 200 into the ODTU4.ts signal.

Hereinafter, with reference to FIG. 12, an example of the multiplexing into the ODTU4.2 signal by the frame combining unit 304 with data of two internal frames the internal frame IF1 and the internal frame IF2 cross-connected by the cross-connect unit 200 as the target is explained. FIG. 12 is a diagram illustrating an example of the multiplexing of two internal frames into the ODTU4.2 signal by the frame combining unit 304. As illustrated in FIG. 12, the frame combining unit 304 of the present embodiment generates the ODTU4.2 signal by multiplexing the two internal frames the internal frame IF1 and the internal frame IF2.

The overhead of the internal frame IF1 and the internal frame IF2 is copied to the overhead of ODTU4.2. In addition, the payload of the internal frame IF1 and the internal frame IF2 is copied to the payload of ODTU4.2 in units of bytes. Specifically, the payload of the internal frame IF1 corresponding to one byte and the payload of the internal frame IF2 corresponding to one byte are alternately copied to the payload of ODTU4.2.

According to the present embodiment, since the overhead of the internal frame is six bytes and information equivalent to JC1-JC6 of ODTU4.ts is stored in the overhead of the internal frame, the overhead of ODTU4.ts may be generated easily from a plurality of internal frames. In addition, according to the present embodiment, since the payload of the internal frame is 15200 bytes, for example, when two internal frames are generated from the ODU1 signal, the payload of ODTU4.ts may be generated easily by multiplexing the payload of two internal frames in units of bytes.

The third transmitting unit 306 outputs a network signal and a client signal using ODTU4.ts signal generated by the frame combining unit 304.

According to the present embodiment, since the ODTU4.ts signal is generated by cross-connecting the ODUk signal input to the transmitting apparatus, the third transmitting unit 306 may output the OTU4 signal easily based on the ODTU4.ts signal.

(Signal Transmitting Method)

Next, a signal transmitting method using the transmitting apparatus of the present embodiment is explained. Meanwhile, The transmitting apparatus of the present embodiment extracts or generates the ODUk signal from an input network signal and a client signal, and generates an internal frame whose frame period and transmission period are fixed regardless of the value of k from the extracted or generated ODUk signal, and performs cross connection in the TDM system in units of internal frames. In addition, the transmitting apparatus of the present embodiment generates an ODTU4.ts signal from the cross-connected internal frames, and outputs it as a network signal and a client signal. Hereinafter, while the case of k=1, ts=2 is particularly explained, the signal transmitting method below may be applied in a similar manner to the cases of other values of k, ts.

Figure 13:
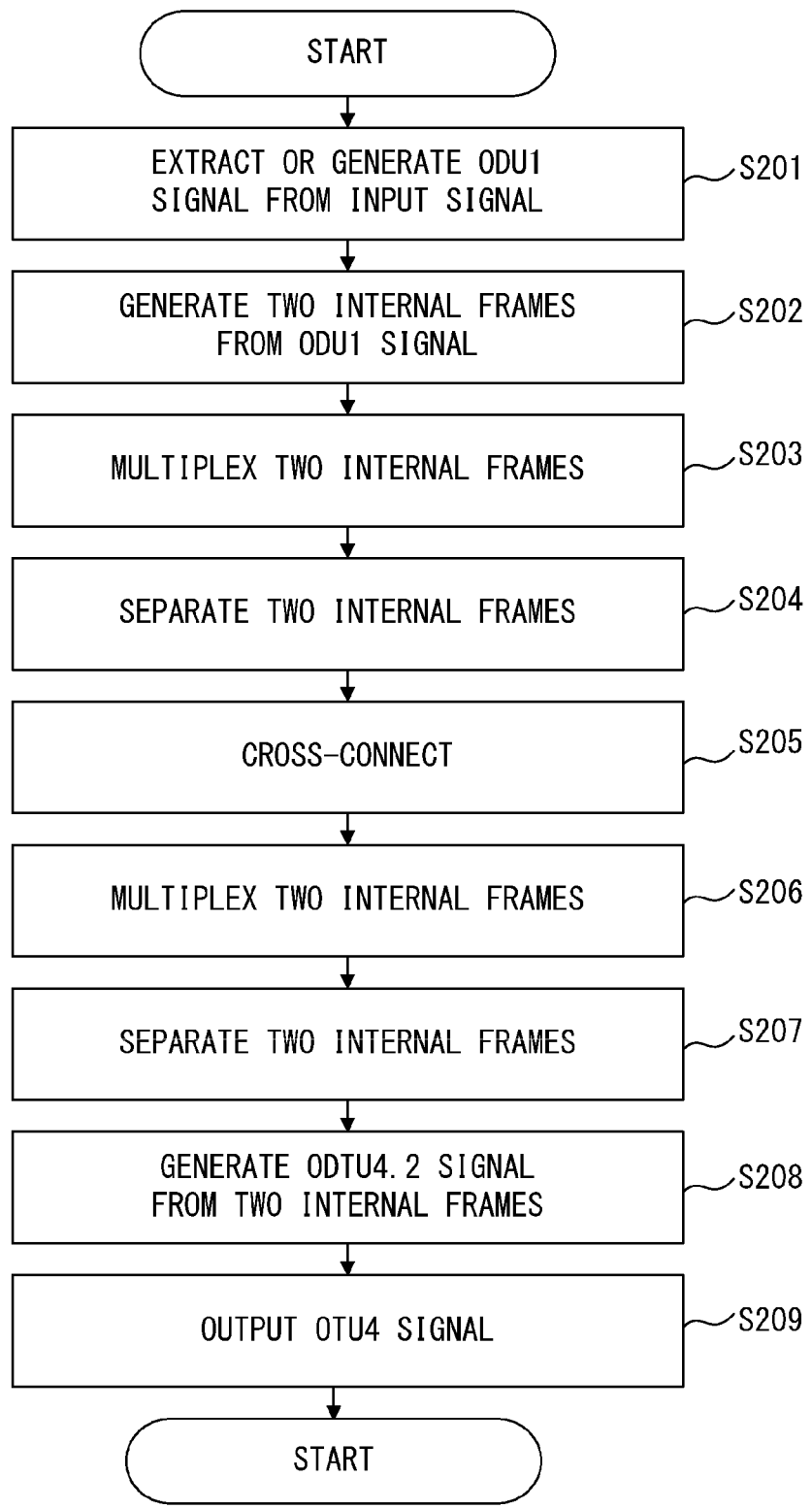
FIG. 13 is a flowchart illustrating an example of a signal transmitting method.

FIG. 13 is a flowchart illustrating an example of the signal transmitting method of the present embodiment. Steps S201-S207 illustrated in FIG. 13 are similar to step S101-S107 of the first embodiment explained with reference to FIG. 10. Therefore, explanation of step S201-S207 is omitted, and steps thereafter are explained below.

The frame combining unit 304 multiplexes data of two internal frames cross connected by the cross-connect unit 200 into an ODTU4.2 signal (step S208). For the multiplexing into the ODTU4.2 signal, the GMP system with 2byte granularity described above is used.

Next, the third transmitting unit 306 outputs an OTU4 signal using the ODTU4.2 signal generated by the frame combining unit 304 (step S209).

As described above, with the transmitting apparatus and the signal transmitting apparatus of the present embodiment, the frame dividing unit 104 maps a predetermined ODUk signal extracted or generated by the first receiving unit 102 into one or a plurality of internal frames whose frame period and transmission rate are fixed, based on a predetermined internal clock. In addition, according to the frame structure of the internal frame the data stored in the overhead of the internal frame of the present embodiment, the ODTU4.ts signal may be generated easily. Therefore, according to the present embodiment, the OUT4 signal may be generated easily.

Meanwhile, to apply the present embodiment, it is preferable to synchronize the internal clock within the transmitting apparatus and the clock of the network.

According to the technique disclosed, in an optical network, a transmitting apparatus and a signal transmitting method with which cross connection may be performed efficiently for a plurality of frames whose period is different from each other may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting apparatus comprising:
a frame dividing circuit that maps frame data of each of a plurality of frames having a different period into one or a plurality of internal frames having a fixed frame period and a fixed transmission rate, based on a predetermined internal clock;
a cross-connect circuit that cross-connects the frame data of the plurality of frames in a time division multiplexing system based on the predetermined internal clock in units of the internal frames; and
a frame combining circuit that demaps, into any of the plurality of frames, or multiplexes, data of one or the plurality of internal frames cross-connected by the cross-connect circuit.

2. The transmitting apparatus according to claim 1, wherein
the frame data of each is mapped into a payload of the internal frame; and
when mapping a first frame of the plurality of frames into m units of internal frames, a transmission rate of the internal frame is larger than a value obtained by dividing a transmission rate of the first frame by said m.

3. The transmitting apparatus according to claim 2, wherein
an overhead of any internal frame among the m units of internal frames includes information identifying a location at which data of the first frame is mapped in a payload of each internal frame.

4. The transmitting apparatus according to claim 2, wherein
among the m units of internal frames, an overhead of the (n−1)th internal frame includes information identifying a location at which data of the first frame is mapped in the payload of the n-th internal frame.

5. The transmitting apparatus according to claim 2, wherein
mapping at the frame dividing circuit is performed in GMP (Generic Mapping Procedure) system, and
the frame combining circuit demaps, or multiplexes, in units of bytes, data of a payload of each of one or a plurality of internal frames.

6. A signal transmitting method comprising: mapping, using a transmitting apparatus, frame data of each of a plurality of frames having a different period into one or a plurality of internal frames having a fixed frame period and a fixed transmission rate, based on a predetermined internal clock of the transmitting apparatus; cross-connecting the frame data of the plurality of frames in a time division multiplexing system in units of the internal frames based on the predetermined internal clock; and demapping, into any of the plurality of frames, or multiplexing, data of said cross-connected one or the plurality of internal frames.

7. The signal transmitting method according to claim 6, wherein
the frame data of each is mapped into a payload of the internal frame; and
when mapping a first frame of the plurality of frames into m units of internal frames, a transmission rate of the internal frame is larger than a value obtained by dividing a transmission rate of the first frame by said m.

8. The signal transmitting method according to claim 7, wherein an overhead of any internal frame among the m units of internal frames includes information identifying a location at which data of the first frame is mapped in a payload of each internal frame.

9. The signal transmitting method according to claim 7, wherein among the m units of internal frames, an overhead of the (n−1)th internal frame includes information identifying a location at which data of the first frame is mapped in the payload of the n-th internal frame.

10. The signal transmitting method according to claim 7, wherein the mapping into the internal frame is performed in GMP (Generic Mapping Procedure) system, and data of a payload of each of one or a plurality of internal frames is demapped, or multiplexed, in units of bytes.

11. A non-transitory computer-readable medium which when executed on a transmitting apparatus having a processor causes the transmitting apparatus to perform a process comprising:

mapping frame data of each of a plurality of frames having a different period into one or a plurality of internal frames having a fixed frame period and a fixed transmission rate, based on a predetermined internal clock;

cross-connecting the frame data of the plurality of frames in a time division multiplexing system in units of the internal frames based on the predetermined internal clock; and demapping, into any of the plurality of frames, or multiplexing, data of said cross-connected one or the plurality of internal frames.

* * * * *